Jan. 8, 1929.                                      1,698,018
R. HENDRICKS
FISH BAIT BOX
Filed May 10, 1927
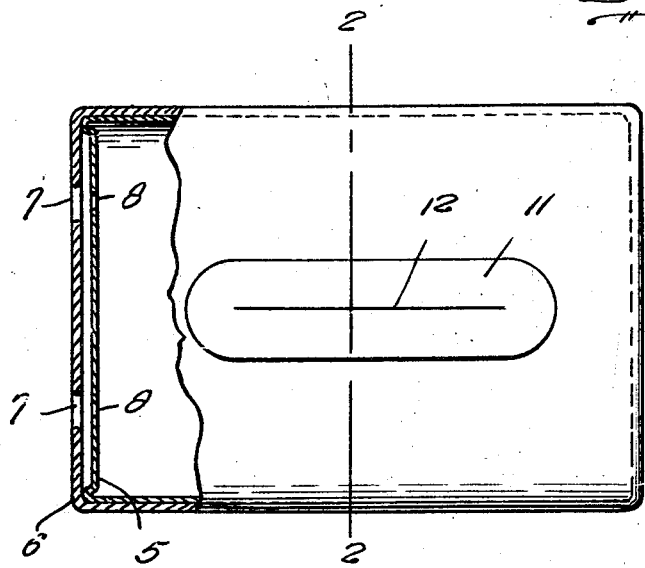
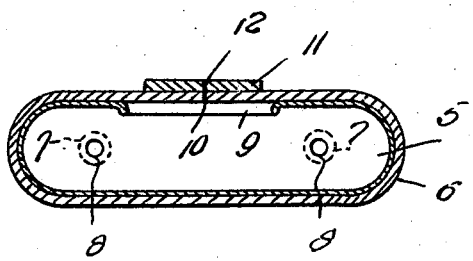
Inventor
Riley Hendricks.
By Clarence A O'Brien
Attorney Patented Jan. 8, 1929.

1,698,018

UNITED STATES PATENT OFFICE.

RILEY HENDRICKS, OF HELENA, MONTANA, ASSIGNOR OF ONE-THIRD TO L. K. MAC-NEILL AND ONE-THIRD TO GEORGE W. PADBURY, JR., BOTH OF HELENA, MONTANA.

FISH-BAIT BOX.

Application filed May 10, 1927. Serial No. 190,225.

This invention relates to new and useful improvements in fishing bait containers, and has for its primary object to provide a relatively small and inexpensive box for containing fish bait, the same being so constructed as to permit of the ready disposition or removal of the bait within or from the box, but at the same time prevent the accidental displacement of the bait therefrom.

The invention further aims to provide a box of this character that may be placed within the water and that has openings therein in order that the water may flow into the interior thereof for maintaining the bait alive until used.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a view partially in top plan and partially in longitudinal section.

Figure 2 is a transverse section taken substantially upon the line 2—2 of Figure 1.

Now having particular reference to the drawing, my novel bait box consists of a container 5 of metal or other suitable rigid material, preferably of the rectangular configuration disclosed in Figure 1, being closed at its ends and rounded at its sides as shown in both of the views.

Formed around the container 5 is a covering of rubber 6 that has at one or both ends openings 7 that register with smaller openings 8 in the ends of the container 5. These openings allow for the circulation of fresh water through the container.

One side wall of the rigid container 5 is formed at its center with a wide and elongated opening 9 having turned down edges as in Figure 2, while directly within the center of this opening the rubber cover 6 is formed with a longitudinal slit 10. Arranged upon the cover 6 over this slit is a reinforcing strip of rubber 11 that in turn is formed with a longitudinal slit 12 having registration with the slit 10 in the cover 6 so that access may be had to the interior of the container 5 to permit of the insertion or removal of the bait therefrom.

It will thus be seen that I have provided a simple and inexpensive bait box that may be readily carried in the pocket of a fisherman and that may be deposited in the water to permit the entrance of water therein so as to maintain the bait fresh or alive.

Having thus described the invention, what I claim as new is:—

1. In a bait box of the character described, a small flat-like rigid container having openings in at least one end thereof, said container being formed with an elongated opening in one of the sides thereof, and a flexible casing adapted to envelop said container, and having a longitudinal slit therein to register with the elongated opening in the container, said casing having openings in at least one end thereof in registry with the openings in the end of said container.

2. In a bait box of the character described, a rigid container having a plurality of openings in one end thereof and having an elongated opening in one side, a flexible casing adapted to envelop said container, said casing being formed with a longitudinal slit to register with the elongated opening in the container, and a strip of reinforcing material secured over said opening and likewise formed with an opening in registry with the opening of the flexible casing.

In testimony whereof I affix my signature.

RILEY HENDRICKS.